United States Patent

[11] 3,601,431

| [72] | Inventor | John W. Henley |
| | | Willoughby, Ohio |
| [21] | Appl. No. | 9,535 |
| [22] | Filed | Feb. 9, 1970 |
| [45] | Patented | Aug. 24, 1971 |
| [73] | Assignee | Eagle-Picher Industries, Inc. |
| | | Cincinnati, Ohio |

[54] RESILIENT FITTING
7 Claims, 6 Drawing Figs.

[52] U.S. Cl. .................................................. 287/104,
287/58, 24/230, 74/519
[51] Int. Cl. ...................................................... F16b 7/00
[50] Field of Search .......................................... 287/58 CT,
2, 58, 104; 285/DIG. 22; 64/11; 248/188.5, 407,
423; 24/1.1, 230 SL; 339/205, 217; 74/519

[56] References Cited
UNITED STATES PATENTS

| 2,225,472 | 12/1940 | Franklin | 24/1.1 |
| 2,545,514 | 3/1951 | Erb | 24/1.1 |
| 2,620,209 | 12/1952 | Flora | 287/58 CT |
| 3,074,203 | 1/1963 | Paksy | 287/2 X |
| 3,074,292 | 1/1963 | Polmon | 287/2 X |
| 3,482,465 | 12/1969 | Lusted | 74/473 P |
| 3,525,427 | 8/1970 | Kulka | 24/230 SL |

Primary Examiner—William F. O'Dea
Assistant Examiner—Thomas R. Hampshire
Attorney—Wood, Herron & Evans ABSTRACT: A one-piece resilient fitting of a tubular configuration for connecting a lever arm in axial alignment with a sleeve. The fitting is particularly adapted to isolate vibrations in the sleeve from the lever arm, and vice versa. Further, the fitting is adapted to transmit a positive force from the lever arm relative to the sleeve in the transverse direction, but is only adapted to resist, i.e., not transmit, axial motion of the lever arm relative to the sleeve. In assembly, the tubular fitting is designed to be snap-fit in nested relation within the sleeve, and then to permit the lever arm to be snap-fit in nested relation within the tubular fitting.

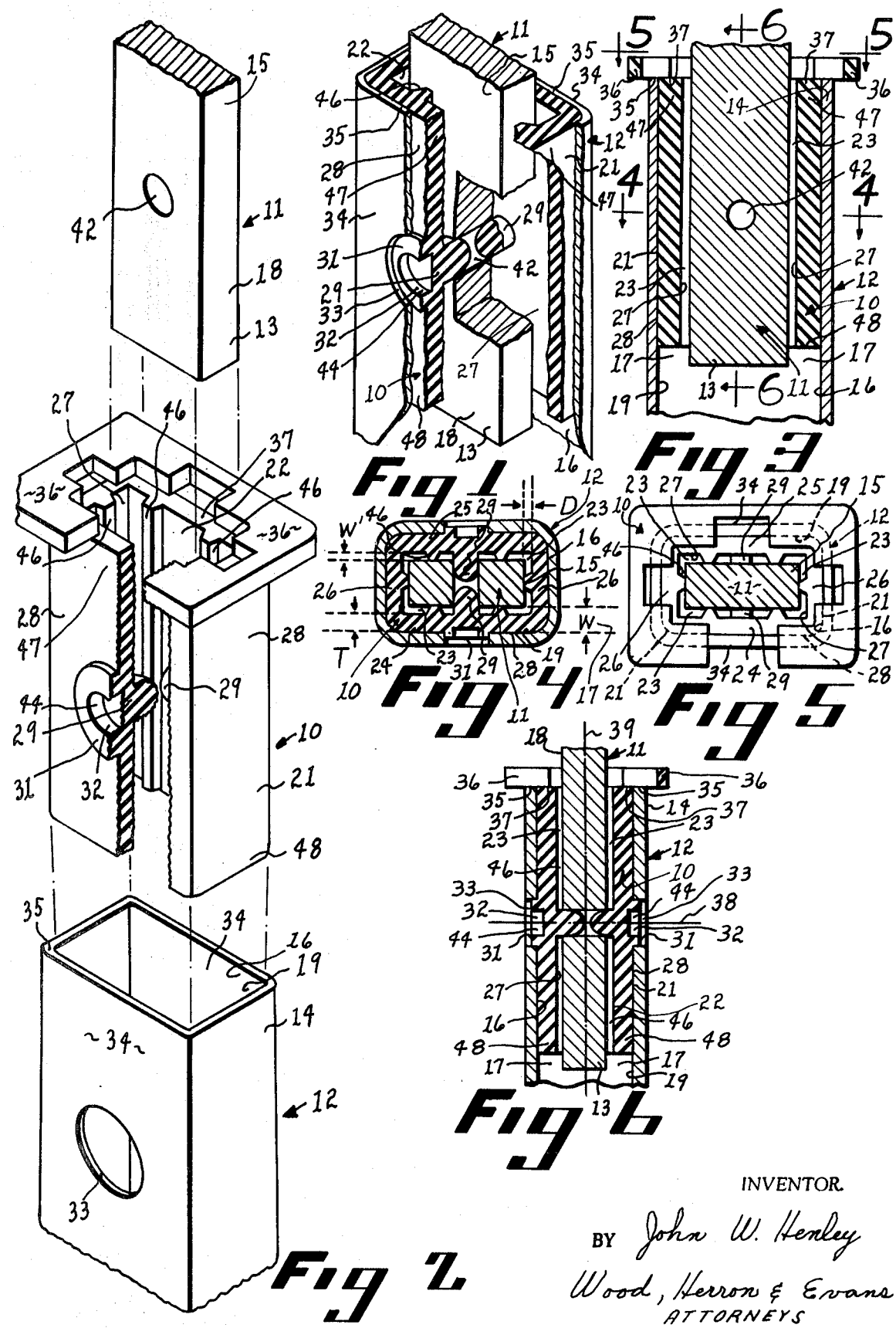

RESILIENT FITTING

This invention relates to a novel fitting or fastening device and, more particularly, relates to a resilient fitting adapted to connect a lever arm in axial alignment with a tubular sleeve.

Resilient fittings or fastening devices are not new in the art and have long been used as noise and vibration dampeners between, for example, an arm and a mounting panel positioned transverse to the arm. But the problem of connecting a lever arm in axial alignment with a sleeve provides unique problems when an interconnection is desired which is substantially noise and vibration free. For example, it is known in the prior art to simply rivet the lever arm directly to the sleeve to make a rigid joint; but, of course, this type connection transmits the noise and vibration that may arise in the sleeve into the lever arm. Further, it is known to interconnect a lever arm in axial alignment with a sleeve by means of a cotter pin; this type of connection permits a slight movement of the lever arm relative to the sleeve but it also transmits noise and vibration from the sleeve to the lever arm.

While numerous end uses for fittings of the type contemplated by this invention will suggest themselves, such fittings can be said to be suitable in those instances where a first work piece in the form of a lever arm is connected with a second work piece in the form of a sleeve, one end of the arm being axially aligned with and partially inserted or telescoped into one end of the sleeve. By way of example, it may be noted that fittings of the type contemplated herein may be used for joining a handle lever to a shifting mechanism of an automobile, or a brake pedal lever to a brake mechanism.

It has been a primary objective of this invention to provide a resilient fitting displaying good noise and vibration dampening characteristics by which a lever arm can be connected to a sleeve.

It has been another objective of this invention to provide a resilient fitting which permits a lever arm to be placed in assembled relation with a sleeve through a snap action coupling without the use of special tools during assembly.

The resilient fitting of this invention, in preferred form, is a unitary or one-piece molding of a resilient or elastic material, and is of a tubular configuration adapted to fit closely against the inner faces of the sleeve, thereby nesting within the sleeve. The tubular fitting is provided with bosses on its exterior faces which snap into seats provided in the sleeve to hold the fitting in place within the sleeve. The fitting is also provided with nipples on its inner faces opposite the bosses molded on the outer faces, and the lever arm presents cavities adapted to receive the nipples when the lever arm is assembled with the fitting. Thus, the lever arm is held in axial and telescopic relation relative to the sleeve, the tubular fitting being mounted between the lever arm and sleeve, by virtue of the fitting's bosses holding the fitting axially immobile relative to the sleeve and by virtue of the fitting's nipples holding the lever arm axially immobile relative to the fitting.

Further, the inner periphery of the tubular fitting is substantially greater than the exterior periphery of the lever arm so that a substantial, annular gap is provided between the inner faces of the fitting and the outer faces of the lever arm when the two are assembled. In this annular gap, and molded integral with the inner faces of the tubular fitting, there is provided a series of ribs running axially of the fitting which are of sufficient depth to maintain the lever arm spaced from the inner faces of the fitting under no-load conditions. The rib structure separates the lever from the sleeve under no-load conditions, thereby substantially isolating the arm from the sleeve and permitting it to float relative to the sleeve so that vibrations and/or noise are not transmitted from the lever arm to the sleeve or vice versa.

During assembly the tubular fitting is first inserted or nested by hand into the sleeve. As the fitting is telescoped into the sleeve, the bosses deform its sidewalls inwardly until the fitting reaches that position where the bosses snap into the seats provided in the sleeve. Thereafter, the lever arm is inserted telescopically, also by hand, into the fitting already in place so that the lever arm nests within the fitting. During assembly of the lever arm the fitting's nipples are deformed radially outward, which deformation is permitted because of the bosses' structure in combination with the seats in the sleeve's inner faces. This permits the lever arm to be axially or telescopically positioned relative to the sleeve at that point where the nipples can snap back into the cavities provided, thereby positioning the lever arm by a snap fit relative to the sleeve.

The novel resilient fitting described above provides a firm interconnection between the lever arm and the sleeve and, at the same time, isolates the lever arm from vibrations set up in the sleeve or vice versa. Further, the unique resilient fitting of this invention permits a sleeve to be assembled with a lever arm without the use of any special tools or the like, i.e., it is essentially self-attaching. Further, the presence of the isolating ribs aid in the support of the lever in its free or floating state or under light loads in a direction transverse to the lever and sleeve, but do not permit any vibrations in the sleeve to be transferred to the lever. Also, and during use of this fitting under operational conditions, a high load on an exposed part or free end of the lever arm in a direction transverse to the sleeve and arm causes the ribs to collapse; the force is then transferred through the fitting to the sleeve itself with that force thereby being transferred to whatever mechanism is attached to the sleeve.

Further objectives and advantages of this invention will be more readily apparent from the following detailed description taken in conjunction with the accompanying drawings in which:

FIG. 1 is a partially broken away perspective view of the resilient fitting of this invention with the flange removed in connecting relation with a lever arm and a sleeve;

FIG. 2 is a partially broken away perspective view that is exploded to illustrate the structure of the fitting, the lever arm, and the sleeve;

FIG. 3 is a cross-sectional view taken axially of the lever arm-fitting-sleeve assembly when in connecting relation, and taken in a plane parallel to the front and back walls of the fitting;

FIG. 4 is a cross-sectional view taken along lines 4—4 of FIG. 3;

FIG. 5 is a cross-sectional view taken along lines 5—5 of FIG. 3; and

FIG. 6 is a cross-sectional view taken along lines 6—6 of FIG. 3.

The resilient fitting 10 of this invention is particularly adapted and designed to interconnect a first work piece in the form of lever arm 11 with a second work piece in the form of sleeve 12, the fitting being tubular in configuration. As illustrated in the Figures, the lever arm's free end 13 which is adapted to be joined to sleeve 12 is provided with a substantially rectangular cross-sectional configuration, and the sleeve's free end 14 which is adapted to be joined with the lever arm is also provided with a substantially rectangular cross-sectional configuration; therefore, the geometrical configuration of the external periphery 15 of the lever arm's free end is substantially the same as the geometrical configuration of the internal periphery 16 of the sleeve's free end. But it will be particularly noted that the lever arm's external periphery 15 is substantially less than the sleeve's internal periphery 16, thereby providing a major gap 17 between the outer faces 18 of the lever arm and the inner faces 29 of the sleeve when the two ends 13, 14 are in telescoped relation, see FIGS. 3 and 4. The major gap 17 itself is in the form of an annulus of a width W that surrounds the lever arm 11 when the lever arm is axially telescoped within the sleeve 12. It is within this major gap 17 that the resilient fitting 10 of this invention is particularly designed to function.

The outer periphery 21 of the tubular fitting 10 is configured substantially identical to the sleeve's inner periphery 16 in cross-sectional configuration, and is substantially the same length as the length of inner periphery 16 of the sleeve 12, see FIG. 4. The inner periphery 22 of the tubular fitting 10 is substantially greater than the outer periphery 15 of the lever arm 11, but is configured substantially identical to the sleeve in cross-sectional configuration. The difference in peripheries 15, 22 is such that a minor gap 23 in the form of an annulus of a width W' is formed between the outer faces 18 of the lever arm 11 and the inner faces 27 of the fitting 10 when those two elements are axially and telescopically assembled. The minor gap 23 is preferably of a width W' approximately equal to one-third the width W of major gap 17, thereby providing a thickness T for front 24, back 25 and side 26 walls of the fitting 10. Thus, the tubular fitting 10 has an exterior periphery 21 of substantially the same cross-sectional geometry and dimensions as the interior periphery 16 of the sleeve 12, and has an interior periphery 22 of substantially the same cross-sectional geometry but substantially greater dimensions than the exterior periphery 15 of the lever arm 11, thereby providing a fitting with exterior faces 28 that fit flush against the inner faces 29 of the sleeve and that creates a minor gap 23 between the inner faces 27 of the fitting and the outer faces 18 of the lever arm 11.

The exterior faces 28 of the tubular fitting 10, on front 24 and back 25 walls, are provided with two bosses 31; the bosses are located opposite one to the other on opposite sides of the fitting, see FIGS. 2 and 6. The bosses 31 are in the nature of an annular rib which extends outwardly from the exterior faces 28 of the tubular fitting 10, the center of each boss being provided with a recess 32 which is of a depth greater than the height of the annular rib, thereby causing the recess to extend into respective walls 24, 25 of the tubular fitting.

The bosses 31 on the tubular fitting are positioned and adapted to cooperate with seats 33 formed in the inner faces 19 of the sleeve 12, the seats being opposite one another and in opposite front and rear walls 34 of the sleeve 12, see FIGS. 2 and 6. The seats 33 in the sleeve 12 may be in the nature of holes completely through the sleeve walls 34 as shown. Preferably the seats 33 in the walls of the sleeve 12 are positioned in that sleeve a distance from the tip 35 thereof which is substantially identical to the distance that the bosses 31 on the tubular fitting 10 are positioned from the underside of positioning flange 36 molded integral with end 37 of the tubular fitting. To assemble the tubular fitting 10 with the sleeve 12, an operator need only telescope or insert the fitting 10 axially within the sleeve by pressing on the positioning flange 36 until the fitting reaches that point where bosses 31 snap into the seats 33 on the inner faces 19 of the sleeve 12. The flange 36 at the end of the tubular fitting 10 aids in achieving this operational relation in that it prevents the fitting from being pushed so far within the sleeve 12 that the bosses 31 bypass the seats 33.

Further, the inner faces 27 of the tubular fitting 10 are provided with two nipples 29 which are molded integral with the fitting on front 24 and back 25 walls, i.e., opposite one to the other on opposed walls, in a position which provides them with the same center line 38 as the center line of the bosses 31, see FIGS. 2, 4 and 6. It will also be noted that the bosses 31 and nipples 29 are symmetrical about centerline 38 and that centerline 38 is transverse to the axis 39 of the fitting 10, lever arm 11 and sleeve 12 when assembled. The nipples 29 are particularly adapted to engage a cavity 42 provided in the lever arm 11. The cavity 42 is provided of a diameter substantially equal to the diameter of the nipples 29, and the cavity extends completely through the lever arm from one side to the other. It will be particularly noted from FIGS. 4 and 6 that the length of each nipple is substantially greater than the minor gap 23 left between the inner faces 27 of the tubular fitting 10 and the outer faces 18 of the lever arm 11 when the lever arm is assembled therewith.

When the lever arm 11 is operatively assembled with the tubular fitting 10-sleeve 12 combination, the nipples 29 extend into the cavity 42 or hole defined in the lever arm to maintain the lever arm in a predetermined axial 39 relation relative to the sleeve, see FIGS. 1, 4 and 6. That is, the nipples 29 tend to resist axial movement of the lever 11 arm relative to the sleeve 12 but they are not designed to impart movement in an axial direction 39 from the lever arm to the sleeve or vice versa.

To assemble the lever arm 11 in operable relation with the tubular fitting 10-sleeve 12 combination, the lever arm is simply telescoped or pushed axially 39 into the open end of the sleeve with the leading end of the lever arm first engaging the nipples 29 and spreading same substantially radially outward from the position illustrated in the figures. The nipples are permitted to spread radially outward because of the recess 32 in the walls 24, 25 of the tubular fitting at that point, and the seat 33 in the walls 34 of the sleeve 12, which cooperate to provide a free space 44 into which the nipples can spread or be forced as the lever arm is telescoped axially into the free end of the sleeve. When the cavity 42 in the lever arm 11 becomes axially aligned with the centerline 38 of the nipples 29, the nipples simply spring or snap into that cavity and, thereby, interconnect the lever arm with the sleeve 12.

Further, the tubular fitting 10 is provided with isolator ribs 46 of a depth preferably at least about equal to the width W' of minor gap 23 between the outer faces 18 of the lever arm 11 and the inner faces 27 of the tubular fitting 12 when the lever arm is assembled with the fitting. Ideally the ribs 46 are of a depth that is a little greater than the width W' of the minor gap when the fitting 10 is in the free or unassembled attitude. If the ribs 46 are of such a little greater depth, then the ribs are "preloaded" or slightly compressed when the fitting 10, lever arm 11 and sleeve 12 are assembled, this helps to stabilize the lever arm relative to the sleeve when the parts 10–12 are assembled.

In the particular embodiment illustrated, the rectangular tubular fitting 10 is provided with two ribs 46 on the inside of each of the front 24 and back 25 walls, one on each side of the nipple 29 on each wall. Further, there is provided a single rib 46 for each sidewall 26 of the tubular fitting 10 on the inner faces 27 thereof, that single rib being centered relative to the front 24 and back 25 walls. The isolator ribs 46 are molded integral with the tubular fitting 10 and are positioned axially thereof, the ribs running from one end 47 of the fitting to the other 48. On the other hand, the nipples 29 on the inner periphery 22 of the tubular fitting 10 and the bosses 31 on the outer periphery 21 of the tubular fitting are positioned centrally of the ends 47, 48 of the fitting.

Thus, when the lever arm 11 is assembled with the sleeve 12 in combination with the tubular fitting 10 of this invention, the isolator ribs 46 maintain the arm 11 in spaced relation from the inner faces 27 of the fitting 10 under no-load or slight load conditions which, in turn, substantially isolates vibrations in the sleeve from the lever arm itself. Further, the isolator ribs 46 tend to guide the lever arm 11 into precise axial 39 alignment with the sleeve 12 and tubular fitting 10 during interconnection or assembly to assure that the cavity 42 in the lever arm will be aligned with the nipples 29 molded integral with the tubular fitting. When the centerline 38 of the cavity 42 becomes aligned with the centerline 38 of the nipples 29, the nipples will then snap thereinto and, thereby, interconnect the lever arm 11 with the sleeve 12.

Thus, and as explained, vibration isolation is attained during use through the isolating ribs 46 which support the lever arm 11 in a free state or under a light load but substantially prevent vibrations from being transferred from the lever arm to the sleeve 12. Further, and as mentioned, the function of the bosses 31 and nipples 29 is primarily to resist axial 39 movement of the lever arm 11 relative to the sleeve 12 and not to impart high forces or loading from the sleeve to the lever arm in an axial 39 direction or vice versa. However, the particular resilient fitting 10 of this invention is particularly adapted to permit high loadings or forces in a direction transverse to the axis 39 of the lever arm 11 and sleeve 12 to be imparted from the lever arm to the sleeve or vice versa. A high force loading on the lever arm 11 in a direction transverse to axis 39 substantially collapses the isolator ribs 46 in that direction in which the motion is imparted; the effort is thereafter translated through the resilient fitting walls 24, 26 into the sleeve 12 itself. The isolator ribs 46 tend to impart a resiliency of movement to the lever arm 11 over a limited stroke, but upon direct contact being achieved between an outer face 18 of the lever arm 11 and an inner face 27 of the resilient fitting 10, the resiliency of movement is lost and the sleeve 12 is then caused to move in that transverse direction in which the lever arm 11 is moving.

It is highly preferred that an elastomeric or rubberlike material which is resilient such as, for example, a polyurethane, be used to fabricate or mold the resilient fitting 10 of this invention. A polyurethane is preferred because it can be compounded to provide a composition which is suitable to transmit high loadings and yet which is resilient enough to provide adequate dampening characteristics. Further, a polyurethane permits the fitting 10 of this invention to be injection molded which, in turn, permits the fitting to be economically manufactured.

Having described in detail the preferred embodiment of my invention, what I desire to claim and protect by Letters Patent is:

1. A one-piece resilient fitting for connecting a lever arm in axial alignment with a sleeve, the outer periphery of said lever arm being substantially less than the inner periphery of said sleeve so that a major gap of annular configuration is formed therebetween when said lever arm is telescoped into and positioned in axial alignment with said sleeve, said fitting including
    walls formed in a tubular configuration, the thickness of said walls being substantially less than the width of said major gap created between said lever arm's outer periphery and said sleeve's inner periphery,
    at least one boss molded integral with the outer faces of said tubular configuration, said boss being adapted to cooperate with a seat in the inner faces of said sleeve to maintain said fitting in axial alignment relative to said sleeve,
    at least one nipple molded integral with the inner faces of said sleeve, said nipple being adapted to cooperate with a cavity in said lever arm to maintain said lever arm in axial alignment with said fitting, and
    a series of ribs molded integral with at least one of the outer faces and the inner faces of said fitting, the depth of each of said ribs being at least about equal to the width of that minor gap created when said fitting, sleeve, and lever arm are assembled.

2. A one-piece resilient fitting as set forth in claim 1 wherein the inner periphery of said sleeve is of substantially the same cross-sectional configuration as the outer periphery of said fitting, and wherein the inner periphery of said fitting is of substantially the same cross-sectional configuration as the outer periphery of said lever arm.

3. A one-piece resilient fitting as set forth in claim 1 wherein the depth of each of said ribs is slightly greater than the width of said minor gap when said fitting is in an unassembled attitude.

4. A one-piece resilient fitting as set forth in claim 1 wherein said ribs are aligned parallel to the axis of said fitting, and wherein said ribs are molded integral with the inner faces of said fitting.

5. A one-piece resilient fitting as set forth in claim 4 wherein said bosses and said nipples are positioned in substantially the same plane, said plane being transverse to the axis of said fitting.

6. A one-piece resilient fitting as set forth in claim 5 wherein said bosses and nipples are positioned on substantially the same centerline and molded integral with the walls of said fitting opposite one to the other.

7. A one-piece resilient fitting as set forth in claim 1 that is injection molded of polyurethane.